Patented July 24, 1951

2,561,787

UNITED STATES PATENT OFFICE 2,561,787

PRODUCTION OF NITRILES

William I. Denton, Woodbury, and Richard B. Bishop, Haddonfield, N. J., assignors to Socony-Vacuum Oil Company, Incorporated, a corporation of New York No Drawing. Application June 15, 1949, Serial No. 99,367

5 Claims. (Cl. 260—465.3)

This invention relates to a process for producing nitriles, and is more particularly concerned with a catalytic process for producing nitriles containing at least two carbon atoms per molecule from olefinic hydrocarbons.

Nitriles are organic compounds containing combined nitrogen. Their formula may be represented thus:

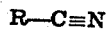

in which R is an alkyl or an aryl group. These compounds are very useful since they can be converted readily to many valuable intermediate products for organic synthesis, such as acids, amines, aldehydes, esters, etc.

As is well known to those familiar with the art, several processes have been proposed for the preparation of nitriles. In general, however, all of these processes have been disadvantageous from one or more standpoints, namely, the relatively high cost of the reactants employed and/or the toxic nature of some of the reactants and/or the number of operations involved in their ultimate preparation. For example, aliphatic nitriles have been synthesized by oxidizing hydrocarbons to acids followed by reacting the acids thus obtained with ammonia, in the presence of silica gel. Other methods have involved reacting alkyl halides with alkali cyanides, reacting ketones with hydrogen cyanide, in the presence of dehydration catalysts, etc. Aromatic nitriles have been synthesized by reacting alkali cyanides with aromatic sulfonates or with aralkyl halides; by reacting complex cyanides, such as potassium cuprous cyanide, with diazonium halides; by reacting isothiocyanates with copper or with zinc dust; and by reacting aryl aldoximes with acyl halides.

A process for producing nitriles has now been found which is simple and inexpensive, and which employs non-toxic reactants. It has now been discovered that nitriles containing at least two carbon atoms per molecule can be prepared by reacting olefinic hydrocarbons with ammonia, at elevated temperatures, in the presence of catalytic material containing nickel or cobalt salts that are stable under the conditions of reaction.

This invention is to be distinguished from the conventional processes for the production of hydrogen cyanide wherein carbon compounds, such as carbon monoxide, methane, and benzene, are reacted with ammonia at elevated temperatures in the presence of alumina, nickel, quartz, clays, oxides of thorium and cerium, copper, iron oxide, silver, iron, cobalt, chromium, aluminum phosphate, etc. The process of the present invention is also to be distinguished from the processes of the prior art for the production of amines and nitriles wherein olefinic hydrocarbons are reacted with ammonia at high temperatures and at very high pressures, in the presence of nickel or cobalt.

Accordingly, it is an object of the present invention to provide a process for the production of nitriles containing at least two carbon atoms per molecule. Another object is to afford a catalytic process for the production of nitriles containing at least two carbon atoms per molecule. An important object is to provide a process for producing nitriles containing at least two carbon atoms per molecule which is inexpensive and commercially feasible. A specific object is to provide a process for producing nitriles containing at least two carbon atoms per molecule from olefinic hydrocarbons. Other objects and advantages of the present invention will become apparent to those skilled in the art from the following description.

Broadly stated, this invention provides an inexpensive and commercially feasible process for the production of nitriles containing at least two carbon atoms per molecule, which comprises reacting an olefinic hydrocarbon with ammonia, in the gaseous phase and at elevated temperatures, in the presence of catalytic material containing a nickel or cobalt salt that is stable under the conditions of reaction. Most mineral acids form salts with nickel or cobalt that are stable under reaction conditions.

Generally speaking, any olefinic hydrocarbon having at least one olefin group (>C=C<) is suitable as the hydrocarbon reactant in the process of this invention. Ethylene, propylene, butenes, octenes, methyl heptenes, butadienes, pentadienes, ethyl butenes, hexadienes, heptenes, pentenes, decenes, etc. may be mentioned by way of non-limiting examples. It will be clear from the discussion of reaction temperatures set forth hereinafter, that many olefinic hydrocarbons are not present per se when in contact with ammonia and a catalyst of the type used herein, for many of them are cracked to related hydrocarbons under such conditions. Nevertheless, all olefinic hydrocarbons and their hydrocarbon decomposition products, which are in the vapor phase under the hereindefined reaction conditions serve the purpose of the present invention. It is to be understood also, that hydrocarbon mixtures containing one or more olefinic hydrocarbons may also be used herein, and that when such mixtures are used, the reaction conditions, such as contact time, will be slightly different in view of the dilution effect of the constituents present with the olefinic hydrocarbon or hydrocarbons. Accordingly, olefinic hydrocarbon mixtures thereof, and hydrocarbon mixtures containing one or more of such olefinic hydrocarbons may be used. Although any olefinic hydrocarbon having at least one olefin group may be utilized in the process, those containing up to about ten carbon atoms per molecule are preferred, and of these, propylene, butenes, and butadienes are especially preferred.

The proportions of reactants, i. e., olefinic hydrocarbons having at least one olefin group and ammonia, used in the process may be varied over a wide range with little effect on the conversion per pass and ultimate yield. In general, the charge of reactants may contain as little as two mol per cent or as much as ninety-eight mol per cent of olefinic hydrocarbons. In practice, however, charges containing between about twenty mol per cent and about ninety mol per cent of olefinic hydrocarbon are used and, ordinarily, charges containing a molar excess of ammonia over the olefinic hydrocarbon reactant are preferred.

In accordance with the present invention, it has been found that the catalysts to be used to produce nitriles containing at least two carbon atoms per molecule, by reacting olefinic hydrocarbons having at least one olefin group with ammonia, are those containing a salt of nickel or cobalt that is stable under the reaction conditions, such as nickel or cobalt phosphate, nickel sulfate or cobalt chloride. Any nickel or cobalt salt that is stable under the reaction conditions is operative in the present process. Obviously, they are not all equally effective, nickel and cobalt phosphates and nickel and cobalt chlorides being preferred.

While these salts exhibit different degrees of effectiveness when used per se, they generally possess additional catalytic activity when used in conjunction with the well known catalyst supports, such as alumina, silica gel, carborundum, pumice, clays and the like. Activated alumina ($Al_2O_3$) is especially preferred as a catalyst support, and it has been found that a catalyst comprising nickel or cobalt phosphate or cobalt chloride supported on activated alumina is particularly useful. Without any intent of limiting the scope of the present invention, it is suspected that the enhanced catalytic activity of the supported catalysts is attributable primarily to their relatively large surface area.

The concentration of catalytic salt in the supported catalysts influences the conversion per pass. In general, the conversion per pass increases with increase in the concentration of catalytic salt. For example, it has been found that a catalyst comprising twenty parts by weight of nickel phosphate on eighty parts by weight of activated alumina is more effective than one comprising ten parts by weight of nickel phosphate on ninety parts by weight of activated alumina. It is to be understood, however, that supported catalysts containing larger or smaller amounts of catalytic salts may be used in the process.

In operation, the catalysts become fouled with carbonaceous material which ultimately affects their catalytic activity. Accordingly, when the efficiency of the catalyst declines to a point where further operation becomes uneconomical or disadvantageous from a practical standpoint, by subjecting the same to a careful oxidation treatment, for example, by passing a stream of air or air diluted with flue gases over the catalyst under appropriate temperature conditions and for a suitable period of time, such as the same period of time as the catalytic operation. Preferably, the oxidation treatment is followed by a purging treatment, such as passing over the catalyst a stream of purge gas, for example, nitrogen, carbon dioxide, hydrocarbon gases, etc.

The reaction or contact time, i. e., the period of time during which a unit volume of the olefinic hydrocarbon reactant is in contact with a unit volume of catalyst, may vary between a fraction of a second and several minutes. Thus, the contact time may be as low as 0.01 second and as high as twenty minutes. Contact times varying between 0.1 second and one minute are preferred and, contact times varying between 0.3 second and thirty seconds are especially preferred.

In general, the temperatures to be used in the process vary between about 800° F. and up to the decomposition temperature of ammonia (about 1250–1300° F.), and preferably, between about 850° F. and about 1075° F. The optimum temperature to be used in any particular operation will depend upon the nature of the olefinic hydrocarbon reactant used and upon the type of catalyst employed. Generally speaking, the higher temperatures increase the conversion per pass but they also increase the decomposition of the reactants, thereby decreasing the ultimate yields of nitriles. Accordingly, the criteria for determining the temperature to be used in a given operation will be based on the nature of the olefinic hydrocarbon reactant, the type of catalyst, and a consideration of commercial feasibility from the standpoint of striking a practical balance between conversion per pass and losses to decomposition.

The process of the present invention may be carried out at superatmospheric, atmospheric or subatmospheric pressures. Superatmospheric pressures are advantageous in that the unreacted charge materials condense more readily. Subatmospheric pressures appear to favor the reactions involved since the reaction products have a larger volume than the reactants, and hence, it is evident, from the law of Le Chatelier-Braun, that the equilibrium favors nitrile formation more at reduced pressures. However, such pressures reduce the throughput of the reactants and present increased difficulties in recycling unreacted charge materials. Therefore, atmospheric pressure or superatmospheric pressures are preferred.

At the present time, the reaction mechanism involved in the process of the present invention is not fully understood. Fundamentally, the simplest possible method of making nitriles is to introduce nitrogen directly into the olefinic hydrocarbon molecule, thereby avoiding intermediate steps with their accompanying increased cost. In the present process, it has been noted that considerable amounts of hydrogen are evolved, that when olefinic hydrocarbons higher than ethylene are employed, aliphatic nitriles having fewer carbon atoms than the olefinic hydrocarbon reactant predominate in the reaction product, and that when olefinic hydrocarbons containing at least six carbon atoms are employed, aliphatic nitriles, as well as aromatic nitriles, are obtained. Hence, it is postulated, without any intent of limiting the scope of this invention, that in the present process, the aliphatic nitriles are formed in accordance with the following equations, using propylene as an example:

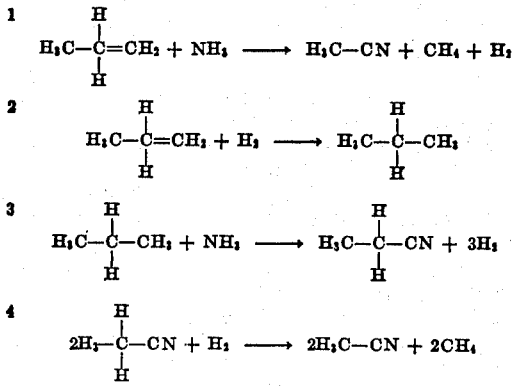

and that when olefinic hydrocarbons containing at least six carbon atoms per molecule are employed, the aliphatic nitriles are formed in accordance with the foregoing equations, while the aromatic nitriles are formed through cyclization of the olefinic hydrocarbon reactant followed by the introduction of nitrogen therein.

The present process may be carried out by making use of any of the well-known techniques for operating catalytic reactions in the vapor phase effectively. By way of illustration, propylene and ammonia may be brought together in suitable proportions and the mixture vaporized in a preheating zone. The vaporized mixture is then introduced into a reaction zone containing a catalyst of the type defined hereinbefore. The reaction zone may be a chamber of any suitable type useful in contact-catalytic operations; for example, a catalyst bed contained in a shell, or a shell through which the catalyst flows concurrently, or countercurrently, with the reactants. The vapors of the reactants are maintained in contact with the catalyst at a predetermined elevated temperature and for a predetermined period of time, both as set forth hereinbefore, and the resulting reaction mixture is passed through a condensing zone into a receiving chamber. It will be understood that when the catalyst flows concurrently, or countercurrently, with the reactants in a reaction chamber, the catalyst will be thereafter suitably separated from the reaction mixture by filtration, etc. The reaction mixture will be predominantly a mixture of aliphatic nitriles, hydrogen, unchanged propylene, and unchanged ammonia. The aliphatic nitriles will be condensed in passing through the condensing zone and will be retained in the receiving chamber. The aliphatic nitriles can be separated from each other by any of the numerous and well known separation procedures, such as fractional distillation. Similarly, the uncondensed hydrogen, the unchanged propylene, the unchanged ammonia can be separated from each other by water scrubbing, etc. The unchanged propylene and ammonia can be recycled, with or without fresh propylene and ammonia, to the process.

It will be apparent that the process may be operated as a batch or discontinuous process as by using a catalyst- bed-type reaction chamber in which the catalytic and regeneration operations alternate. With a series of such reaction chambers, it will be seen that as the catalytic operation is taking place in one or more of the reaction chambers, regeneration of the catalyst will be taking place in one or more of the other reaction chambers. Correspondingly, the process may be continuous when one or more catalyst chambers, through which the catalyst flows in contact with the reactants, are used. In such a continuous process the catalyst will flow through the reaction zone in contact with the reactants and will thereafter be separated from the reaction mixture, as for example, by accumulating the catalyst on a suitable filter medium, before condensing the reaction mixture. In a continuous process, therefore, the catalyst—fresh or regenerated—and the reactants—fresh or recycle—will continuously flow through a reaction chamber.

The following detailed examples are for the purpose of illustrating modes of preparing nitriles in accordance with the process of this invention, it being clearly understood that the latter is not to be considered as limited to the specific olefinic hydrocarbon reactants or to the specific catalysts disclosed therein or to the manipulations and conditions described therein. As it will be apparent to those skilled in the art, a wide variety of other olefinic hydrocarbons and other catalysts of the type described hereinbefore may be used to produce nitriles in accordance with the process of this invention.

*Example 1*

A catalyst consisting of 10 per cent nickel orthophosphate and 90 per cent activated alumina was prepared as follows: 300 grams of activated alumina of 4-8 mesh was treated with an aqueous solution of nickel nitrate in sufficient amounts to produce 10 per cent by weight of nickel phosphate on the finished catalyst. The mixture was dried at 250° F. The dried mixture was then treated with an aqueous solution of ammonium phosphate and the mixture was again dried at 250° F. The catalyst thus obtained was then heated at 1000° F. for one hour.

A mixture of ammonia and $C_3$-hydrocarbon (30 per cent propylene and 70 per cent propane) was passed thereover at 925° F., 4.5 seconds contact time, under atmospheric pressure, and in a molar ratio of ammonia to hydrocarbon of 2:1. Fifteen per cent by weight of the propylene charged was converted to acetonitrile in one pass.

*Example 2*

Three-hundred grams of activated alumina, 4-8 mesh, were treated with 500 c. c. of an aqueous solution containing 30 grams of cobaltous chloride and the mixture thus obtained was dried at a temperature of 250° F. The dried mixture was heated in a muffle furnace at a temperature of 1000° F. for one hour.

A mixture of ammonia and $C_3$-hydrocarbon (53 per cent propylene and 47 per cent propane) was passed over the catalyst at a temperature of 945° F., 4.5 seconds contact time, under atmospheric pressure, and in a molar ratio of ammonia to hydrocarbon of 2:1. Fourteen per cent by weight of the propylene charged was converted to acetonitrile in one pass.

*Example 3*

The run of Example 2 was repeated using a catalyst obtained by treating 300 grams of activated alumina, 4-8 mesh, with an aqueous solution of cobaltous nitrate in sufficient amounts to produce 10 per cent by weight of cobalt phosphate in the finished catalyst. The mixture was dried at 250° F. The dried mixture was then treated with an aqueous solution of ammonium phosphate and the mixture thus obtained was again dried at 250° F. The catalyst was then heated in a muffle furnace for one hour at 1000° F. Nine per cent by weight of the propylene charged was converted to acetonitrile in one pass.

It will be apparent that the present invention provides an efficient, inexpensive and safe process for obtaining nitriles. This process is of considerable value in making available relatively inexpensive nitriles which, as stated hereinbefore, find many uses as intermediates in organic synthesis.

This application is a continuation-in-part of application, Serial No. 762,200, filed July 19, 1947; now Patent No. 2,496,659, issued February 7, 1950, which in turn is a continuation-in-part of application, Serial No. 539,033, filed June 6, 1944, now abandoned.

What is claimed is:

1. A process for the production of nitriles having at least two carbon atoms per molecule, that comprises reacting an olefinic hydrocarbon containing up to about ten carbon atoms per molecule with ammonia, in vapor phase, at a temperature varying between about 850° F. and about 1075° F., in the presence of a salt selected from the group consisting of nickel phosphate, cobalt chloride, and cobalt phosphate, as the catalyst.

2. A process for the production of nitriles having at least two carbon atoms per molecule, that comprises reacting an olefinic hydrocarbon containing up to about ten carbon atoms per molecule with ammonia, in vapor phase, at a temperature varying between about 850° F. and about 1075° F., in the presence of a salt selected from the group consisting of nickel phosphate, cobalt chloride, and cobalt phosphate, supported on a catalyst support, as the catalyst.

3. A process for the production of nitriles having at least two carbon atoms per molecule, which comprises reacting propylene with ammonia, in vapor phase, at a temperature varying between about 850° F. and about 1075° F., in the presence of nickel phosphate supported on alumina, as the catalyst.

4. A process for the production of nitriles having at least two carbon atoms per molecule, which comprises reacting propylene with ammonia, in vapor phase, at a temperature varying between about 850° F. and about 1075° F., in the presence of cobalt phosphate supported on alumina, as the catalyst.

5. A process for the production of nitriles having at least two carbon atoms per molecule, which comprises reacting propylene with ammonia, in vapor phase, at a temperature varying between about 850° F. and about 1075° F., in the presence of cobalt chloride supported on alumina, as the catalyst.

WILLIAM I. DENTON.
RICHARD B. BISHOP.

REFERENCES CITED

The following references are of record in the file of this patent:

UNITED STATES PATENTS

| Number | Name | Date |
|---|---|---|
| 1,920,795 | Jaeger | Aug. 1, 1933 |
| 2,381,471 | Teter | Aug. 7, 1945 |
| 2,381,472 | Teter | Aug. 7, 1945 |
| 2,381,473 | Teter | Aug. 7, 1945 |
| 2,432,532 | Mahan | Dec. 16, 1947 |
| 2,496,659 | Denton et al. | Feb. 7, 1950 |
| 2,496,661 | Denton et al. | Feb. 7, 1950 |